US011247930B2

(12) United States Patent
Kronhardt et al.

(10) Patent No.: US 11,247,930 B2
(45) Date of Patent: Feb. 15, 2022

(54) METHOD AND DEVICE FOR BENDING A GLASS PANE

(71) Applicant: SAINT-GOBAIN GLASS FRANCE, Courbevoie (FR)

(72) Inventors: Heinrich Kronhardt, Kreuzau (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 414 days.

(21) Appl. No.: 16/330,660

(22) PCT Filed: Jan. 11, 2018

(86) PCT No.: PCT/EP2018/050620
§ 371 (c)(1),
(2) Date: Mar. 5, 2019

(87) PCT Pub. No.: WO2018/137931
PCT Pub. Date: Aug. 2, 2018

(65) Prior Publication Data
US 2019/0225528 A1 Jul. 25, 2019

(30) Foreign Application Priority Data

Jan. 30, 2017 (EP) ..................... 17153726

(51) Int. Cl.
*C03B 23/023* (2006.01)
*C03B 35/14* (2006.01)
(Continued)

(52) U.S. Cl.
CPC .......... *C03B 23/0235* (2013.01); *C03B 29/08* (2013.01); *C03B 35/202* (2013.01)

(58) Field of Classification Search
None
See application file for complete search history.

(56) References Cited

U.S. PATENT DOCUMENTS 3,697,243 A * 10/1972 Arvi .................... C03B 23/0258
65/273
3,764,288 A * 10/1973 Gallez .................... C03B 29/08
65/273
(Continued)

FOREIGN PATENT DOCUMENTS

AU 780337 B2 3/2005
CN 1088550 A 6/1994
(Continued)

OTHER PUBLICATIONS

International Search Report issued in International Patent Application No. PCT/EP2018/050620, dated Apr. 13, 2018.
(Continued)

*Primary Examiner* — Jodi C Franklin
(74) *Attorney, Agent, or Firm* — Pillsbury Winthrop Shaw Pittman LLP

(57) ABSTRACT

A method for bending a glass pane in a furnace, wherein the furnace has an inlet and an outlet, includes providing a glass pane on a mounting, wherein the mounting is preheated, introducing the mounted glass pane into the inlet of the furnace for bending, discharging the bent, mounted glass pane out of the outlet of the furnace, withdrawing the bent, mounted glass pane from the mounting, installing thermal insulation on the mounting, returning the mounting and the thermal insulation using a transport device, removing the thermal insulation prior to renewed mounting, wherein the aforementioned steps are carried out again in a cyclical manner.

18 Claims, 2 Drawing Sheets

(51) Int. Cl.
*C03B 35/20* (2006.01)
*C03B 29/08* (2006.01)

(56) References Cited

U.S. PATENT DOCUMENTS

| | | | | |
|---|---|---|---|---|
| 4,349,375 | A * | 9/1982 | Kellar | C03B 23/0357 65/104 |
| 4,421,481 | A | 12/1983 | Holz et al. | |
| 4,497,645 | A * | 2/1985 | Peltonen | C03B 29/08 65/107 |
| 4,514,208 | A | 4/1985 | Nitschke | |
| 4,889,547 | A * | 12/1989 | Lecourt | C03B 23/0258 65/107 |
| 4,909,820 | A * | 3/1990 | Hirotsu | C03B 23/027 65/106 |
| 4,973,348 | A * | 11/1990 | Ujiie | C03B 23/0235 65/288 |
| 5,069,704 | A * | 12/1991 | Boutier | C03B 23/0258 65/106 |
| 5,147,440 | A * | 9/1992 | Leponen | C03B 23/03 65/173 |
| 5,173,102 | A | 12/1992 | Weber et al. | |
| 5,178,659 | A * | 1/1993 | Watanabe | C03B 23/0235 65/106 |
| 5,364,436 | A * | 11/1994 | Montonen | C03B 23/0235 65/106 |
| 5,472,470 | A * | 12/1995 | Kormanyos | C03B 23/03 65/287 |
| 5,755,845 | A | 5/1998 | Woodward et al. | |
| 6,240,746 | B1 | 6/2001 | Maeda et al. | |
| 8,978,418 | B2 | 3/2015 | Balduin et al. | |
| 9,096,456 | B2 | 8/2015 | Thellier et al. | |
| 2007/0205788 | A1 | 9/2007 | Natsuhara et al. | |
| 2007/0267405 | A1* | 11/2007 | Feigen-Blum | H05B 6/105 219/601 |
| 2009/0244472 | A1* | 10/2009 | Dunn | H05K 7/20972 349/161 |
| 2010/0000259 | A1* | 1/2010 | Ukrainczyk | C03B 33/00 65/104 |
| 2010/0257900 | A1* | 10/2010 | Yajima | C03B 29/08 65/106 |
| 2011/0265515 | A1* | 11/2011 | Hernandez Delsol | H05B 6/78 65/29.18 |
| 2012/0297828 | A1* | 11/2012 | Bailey | C03B 23/0357 65/29.18 |
| 2014/0352357 | A1* | 12/2014 | Jiao | C03B 29/08 65/104 |
| 2015/0344346 | A1* | 12/2015 | Jiao | C03B 35/187 65/29.11 |
| 2016/0145141 | A1* | 5/2016 | Bennett | C03B 40/027 65/29.1 |
| 2016/0318788 | A1* | 11/2016 | Hong | C03B 23/0235 |
| 2017/0283295 | A1* | 10/2017 | Immerman | C03B 11/125 |
| 2017/0297944 | A1* | 10/2017 | Yea | C03B 23/0235 |
| 2018/0297886 | A1* | 10/2018 | Thomas | C03B 29/08 |
| 2019/0023601 | A1* | 1/2019 | Liu | B29C 51/46 |
| 2021/0147277 | A1* | 5/2021 | Palmantier | C03B 23/03 |

FOREIGN PATENT DOCUMENTS

| | | |
|---|---|---|
| CN | 1455760 A | 11/2003 |
| CN | 102610549 A | 7/2012 |
| DE | 44 38 261 C1 | 9/1995 |
| DE | 197 14 360 A1 | 10/1998 |
| DE | 10 2005 001513 B3 | 6/2006 |
| EA | 26934 B1 | 6/2017 |
| GB | 1 299 384 A | 12/1972 |
| JP | S56-26734 A | 3/1981 |
| JP | S56-145921 A | 11/1981 |
| JP | S57-140325 A | 8/1982 |
| KR | 10-2016-0041718 A | 4/2016 |
| RU | 2143407 C1 | 12/1999 |
| WO | WO 2012/080194 A1 | 6/2012 |

OTHER PUBLICATIONS

Office Action as issued in Chinese Patent Application No. 201880000306.3, dated Jun. 9, 2021.

* cited by examiner

METHOD AND DEVICE FOR BENDING A GLASS PANE

CROSS-REFERENCE TO RELATED APPLICATIONS

This application is the U.S. National Stage of PCT/EP2018/050620 filed on Jan. 11, 2018, which in turn claims priority to European patent application number 17153726.9 filed Jan. 30, 2017. The content of these applications are incorporated herein by reference in their entireties.

BACKGROUND OF THE INVENTION

In current practice—in particular in the automobile industry—glass panes are found that are not flat, but have, instead, bends in a variety of forms.

Without loss of generality, reference is made in the following to "glass panes", wherein this term is not to be understood as limiting, but can also relate, for example, to a variety of glass panes as they are to be found, for example, in the production of composite glass panes.

Typically, bent glass panes are produced in that a glass pane is mounted on a suitable mounting and is heated—e.g., to 650° C.—such that the glass pane is brought to the desired shape under the influence of gravity and/or by shaping, such as pressing, drawing, sucking. Subsequently, the now bent glass pane is cooled and removed from the mounting.

Without loss of generality, additional steps can be provided before, between, and afterwards, e.g., it can be necessary to bend a pane in different directions in order to obtain a desired shape. Provision can also be made for the pane to be heated several times. In other words, in the following, the term "furnace" is understood in a broad sense and includes any apparatus that is suitable to bring a glass pane to a temperature of 180° C. or more, e.g. 650° C. or to hold it at such a temperature. Here, "furnace" can be understood to mean the entire thermal bending process.

After removal of the glass pane from the mounting, the mounting can be used again.

This can enable mass production of bent glass panes.

In one production line, multiple glass panes can even be situated on respective mountings at the same time—e.g., in different process steps.

Reference is made here, by way of example, to the international patent application PCT/EP2011/072492 of the applicant, which depicts in FIG. 1 a schematic representation of an exemplary prior art production process.

However, the previous production methods and the previous devices are disadvantageous.

Thus, it has been demonstrated that a large part—e.g., 20%—of the heating output of the furnace must be used to heat the mounting(s) to the desired temperature, because, typically, the temperature of the mountings drops from the removal of a bent glass pane until their reuse.

This results in high operating costs, which it is important to avoid.

It has further been demonstrated that the quality of the bend fluctuates greatly. For example, effects of the thermal expansion of the mounting become perceptible. Since the temperature decreases depending on the time elapsed until reuse of mounting, the "start temperature" is highly variable. During the subsequent heating in the furnace the mountings expand differently. Since the mounting also assumes relatively complex shapes, the heat conduction and, consequently, the accompanying expansion are difficult to anticipate. Thus, the expansions are always different depending on the "start temperature" and dwell time in the furnace, as well as on the respective configuration of the mounting, connection points on the mounting, etc. In addition, the temperature curve for the bending varies, since, now, depending on the "start temperature", heating energy is also used to heat the mounting.

However, these variations also influence the results of the bend and, thus, also the quality of the bent glass panes produced. If the bends deviate too greatly, the pane is unusable because it can either no longer be installed or has negative optical properties, or even violates threshold values for approval.

Known from the Japanese patent application JP S56-26734 A is a glass bending apparatus with a transport device for glass. The glass bending apparatus uses a cyclical method for bending glass panes in a furnace, wherein the panes are run through the furnace on mountings and, after unloading the bent panes, the empty mountings are routed back to the starting point through a shaft arranged above the furnace. The shaft is heated by hot exhaust gases of the furnace, as a result of which the empty mountings are heated. The apparatus requires a specific arrangement which is also voluminous. There is also a heat loss from the arrangement which requires discharge of hot exhaust gases.

Starting from this situation, one object of the invention is to make available a device and a method that enable providing bent glass panes economically and with high precision.

BRIEF DESCRIPTION OF THE INVENTION

The object is accomplished by a method for bending a glass pane in a furnace, wherein the furnace has an inlet and an outlet. The method has a step of providing a glass pane on a mounting, wherein the mounting is preheated. The method further has the step of introducing the mounted glass pane into the inlet of the furnace for bending and the step of discharging to the bent, mounted glass pane out of the outlet of the furnace. In another step, the bent, mounted glass pane is removed from the mounting. A thermal insulation is subsequently installed on the mounting. The mounting and the thermal insulation are returned in another step by means of a transport device. Then, prior to a new mounting process, the thermal insulation is removed, whereupon the aforementioned steps are carried out again in a cyclical manner.

In one embodiment of the method, the mounting is heated, at least intermittently, between withdrawing the bent, mounted glass pane from the mounting and introducing the mounted glass pane into the inlet of the furnace. In another embodiment of the method, the thermal insulation is implemented like a hood and is put over the mounting during the installing of the thermal insulation.

According to another embodiment of the method, the mounting is transported out of the vicinity of the outlet of the furnace into the vicinity of the inlet of the furnace in less than 60 seconds.

According to yet another embodiment of the method, controlled/regulated or uncontrolled heating of the mounting is provided, at least intermittently, between withdrawing the bent, mounted glass pane from the mounting and introducing the glass pane provided into the inlet of the furnace.

In yet another embodiment of the method, the temperature of the mounting is 200° C. or more before entry into the furnace.

The object is further accomplished by a device for bending a plurality of glass panes with a furnace, wherein the furnace has an inlet and an outlet, wherein the device includes a transport device for transporting a mounting for a glass pane such that the mounting is provided on the transport device for transport from the outlet of the furnace to the inlet of the furnace, wherein, furthermore, thermal insulation is provided for the mounting on the transport device.

In one embodiment of the device, the thermal insulation is implemented like a hood.

According to another embodiment of the device, the transport device is a conveyor belt or has linear transport carriages.

In another embodiment of the device, the transport device is suitable for transporting a mounting out of the vicinity of the outlet of the furnace into the vicinity of the inlet of the furnace in less than 60 seconds.

According to yet another embodiment of the device, a heating device is provided on the transport device for the mounting, which has, at least intermittently, controlled/regulated or uncontrolled heating of the mounting between withdrawing the bent, mounted glass pane from the mounting and introducing the glass pane provided into the inlet of the furnace.

In yet another embodiment of the device, the heating device is arranged on the lower end of the mounting during transport by means of the transport device.

The object is further accomplished by a device for bending a plurality of glass panes with a furnace, wherein the furnace has an inlet and an outlet, wherein the device comprises a transport device for transporting a mounting for a glass pane such that the mounting is provided on the transport device for transport from the outlet of the furnace to the inlet of the furnace, wherein the transport device has a conveyor belt or linear transport carriages.

In another embodiment of the device, the transport device is suitable for transporting a mounting out of the vicinity of the outlet of the furnace into the vicinity of the inlet of the furnace in less than 60 seconds.

The object is further accomplished by a device for bending a plurality of glass panes, wherein the furnace has an inlet and an outlet, wherein the device comprises a transport device for transporting a mounting for a glass pane such that the mounting is provided on the transport device for transport from the outlet of the furnace to the inlet of the furnace, wherein, moreover, a heating device for the mounting is provided on the transport device, which has, at least intermittently, controlled/regulated or uncontrolled heating of the mounting between withdrawing the bent, mounted glass pane from the mounting and introducing the glass pane provided into the inlet of the furnace.

In another embodiment of the device, the heating device is arranged on the lower end of the mounting during transport by means of the transport device. In principle, no limits are established for the arrangement of the heating device such that even a side arrangement or an arrangement on the upper end is possible.

According to an embodiment of all devices according to the invention, the temperature of the mounting before entry into the furnace is 200° C. or more.

BRIEF DESCRIPTION OF THE DRAWINGS

Embodiments of the present invention are described by way of example with reference to the accompanying drawings, which depict.

DETAILED PRESENTATION OF THE INVENTION WITH REFERENCE TO THE DRAWINGS

In the following, the invention will be presented in detail with reference to the drawings. It must be noted that various aspects are described which can in each case be used individually or in combination. In other words, any aspect can be used with different embodiments of the invention unless explicitly represented as a pure alternative.

Moreover, in the following, for the sake of simplicity, reference is, generally speaking, always made to only one entity. Unless explicitly stated, the invention can, however, also refer in each case to a plurality of the entities in question. Thus, the use of the words "a" and "an" is understood to indicate that in a simple embodiment at least one entity is used.

In the methods described in the following, individual steps can be incorporated into a single step and executed, for example, at the same time. In addition, the order of steps can vary such that the order of steps is not to be construed as mandatory, unless a specific order is described as explicitly necessary.

Figure 1:
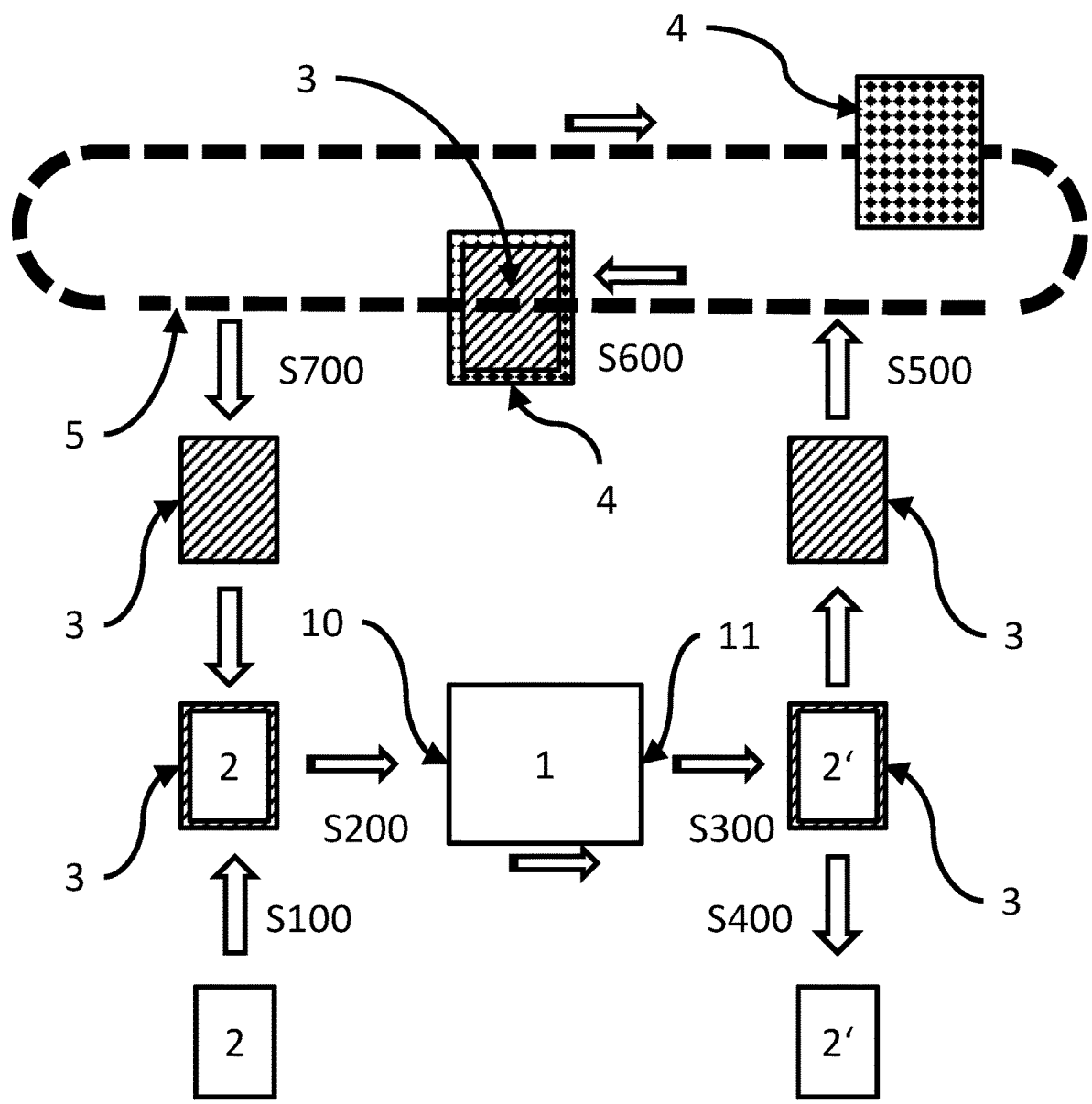
FIG. 1 schematically, an embodiment of the device according to the invention, and FIG. 2 schematically, a flowchart of steps of the method according to embodiments of the invention.

FIG. 1 schematically depicts an embodiment of the invention in which a method according to the invention can be used. For easier orientation, individual elements are depicted with similar reference characters and/or hatching. The method is suitable for bending a glass pane 2 in a furnace 1, wherein the furnace has an inlet 10 and an outlet 11. Both the unbent glass pane 2 and the bent glass pane 2' are depicted as non-hatched rectangles.

In a first step S100, at least one glass pane 2 is provided on a mounting 3, wherein the mounting 3 is preheated. The mounting 3 is depicted as a hatched rectangle. In this context, "preheated" means that the mounting has a temperature of more than 180° C., in particular 200° C. or more. The heating can be provided by a previous use and/or by active heating, as will be further explained in the following.

In another step S200, the mounted glass pane 2 is introduced into the inlet 10 of the furnace 1 for bending. Without loss of generality, in the following, reference is made to glass panes, wherein this term is understood as nonlimiting, but can, instead, also relate, for example, to a plurality of glass panes, as they are found, for example, in the production of laminated glass panes.

After a certain dwell time in the furnace and bending, the bent, mounted glass pane 2' is discharged from the outlet 11 of the furnace 1 in step S300.

Subsequently, immediately or after a cooling period, the now bent, mounted glass pane 2' can be removed from the mounting 3 in step S400.

The currently out-of-use mounting 3 can now be protected in various ways against cooling, wherein the various ways are not mutually exclusive but, instead, can be used in any combination.

Thus, it is, for example, possible, in a step S500 to install thermal insulation 4 on the mounting 3. The thermal insulation 4 is depicted as a diamond-patterned rectangle. As a result, the natural radiation of heat can be reduced such that the mounting is still preheated in the context of the invention after a return to step S100. Advantageously, such a passive measure should be applied as soon as possible after withdrawing the glass pane 2' from the mounting 3.

At the same time or subsequently, the mounting 3 is returned in step S600 by means of a transport device 5. The transport device 5 is depicted as a thick dashed line.

In another step S700, the thermal insulation 4 is removed prior to a renewed mounting process in a renewed step S100.

These steps can be carried out again in a cyclical manner in a production line.

The installing of the thermal insulation 4 reduces heat loss. Thus, the mounting 3 remains preheated and less heating power is required. Thus, production costs decrease. In addition, the heat distribution of the mounting 3 is improved by the thermal insulation 4 such that there are fewer stresses in the mounting and, consequently, improved quality of the bent glass panes 2' can be provided. In particular, however, with the invention presented, the space requirement can also be reduced since now less heating power has to be made available, or heat losses can be reduced. With the measure presented, energy consumption can be reduced by approx. 10%.

The thermal insulation 4 can, for example, be implemented as a hood that is put over the mounting 3 at the time of installing (S500) the thermal insulation (4). The more precisely fitting this hood, the lower the heat loss. This hood can, for example, be coated by a film, as is known from rescue blankets. Furthermore, this hood can have materials such as rock wool, glass wool, or ethylene-propylene copolymers, polyimide, silicone-coated glass fiber fabric, with the temperature of the mounting 3 prior to installing the thermal insulation or the setpoint temperature of the mounting 3 possibly limiting the selection of materials.

In an embodiment of the invention, which can be implemented as an alternative to or in addition to steps S500 and S700, i.e., the installing and removing of the thermal insulation, the mounting 3 is heated, at least intermittently, between withdrawing S400 the bent, mounted glass pane 2' from the mounting 3 and introducing S200 the mounted glass pane 2 into the inlet of the furnace 1.

This heating can, for example, be provided by an electrical resistance heater or by burning gas. For example, electrical energy can be supplied to the mounting 3 without contact by an inductive coupling such that no heat sensitive cable connection is necessary. The actual heating device can then be implemented as a resistance element. Both options identified permit an independent design of the transport device 5. In particular, both options identified are simple to implement.

The heating device can heat individual parts of the mounting 3 or the entire mounting 3. For example, the heating device can be arranged at the lower end of the mounting 3 during the transport by means of the transport device 5 such that rising heat heats the mounting 3 uniformly.

Without loss of generality, this preheating can be controlled/regulated or uncontrolled. Controlled heating can, for example, be time controlled. Regulated heating can be provided through comparison of an actual temperature with a setpoint, with the heating controlled depending on the comparison.

For example, regulation can be undertaken by means of a temperature sensor on the mounting 3 such that, for example, in an optional step S550, a check is performed as to whether the temperature has dropped to or below a specified value, for example, 200° C., and, if so, in a step S560, the heating device is switched on. After that, the heating can be continued until the mounting 3 has reached a desired target temperature, e.g., 280° C. For this, a check can be performed in an optional step S650 as to whether the temperature has reached or exceeded a specified value e.g. 280° C., and, if so, the heating device is switched off in a step S660.

Figure 2:
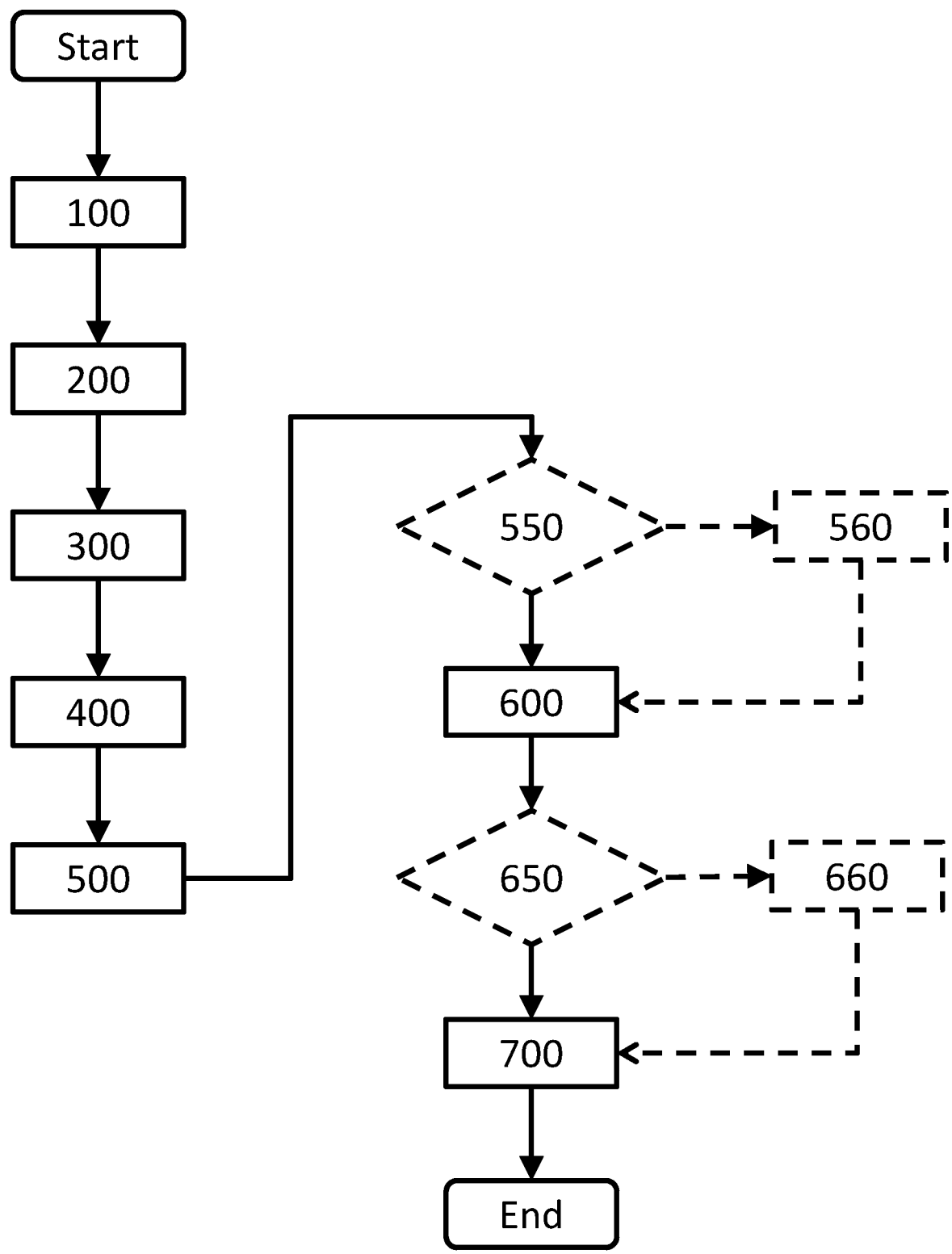

Even when these steps in FIG. 2 are arranged before or after the step S600 of returning, no restriction is associated with this. Instead, the steps S550, S560, S650, S660 can also be carried out cyclically between the steps S500 and S700.

By means of this measure, the energy loss can be reduced by approx. 5%. In other words, although, apparently, more energy is required, the overall energy balance and the quality balance are positive.

In an embodiment of the invention, which can be implemented as an alternative or in addition to steps S500 and S700, i.e., installing and removing thermal insulation and/or as an alternative or in addition to steps S550, S560, S650, S660, the mounting 3 is left outside the furnace 1 for only a short time. This can, for example, be implemented by means of a transport device 5 that provides a relatively high speed, for example, a conveyor belt, linear transport carriages, etc.

It is particularly advantageous for a mounting to be transported out of the vicinity of the outlet 11 of the furnace 1 into the vicinity of the inlet 10 of the furnace in less than 60 seconds.

With this further passive measure, the energy loss can be reduced by approx. 5%. In addition, the procurement and maintenance outlay for the mountings is minimized, since now the number of mountings can be reduced through the use of a (high-speed) conveyor belt, linear transport carriages, etc.

In all embodiments of the invention, it has proved advantageous for the temperature of the mounting 3 to be 200° C. or more before entry into the furnace 1. This temperature can be obtained by one measure or by the combination of measures.

By combining the measures, the energy consumption can be reduced by as much as 20%. In addition, the procurement costs as well as the maintenance costs for the mountings can be reduced.

All measures enable (individually or in combination) minimizing the energy loss, reducing costs, and increasing the quality of the bent glass panes obtained.

LIST OF REFERENCE CHARACTERS

1 furnace
2, 2' glass pane
3 mounting
4 thermal insulation
5 transport device
10 inlet of the furnace
11 outlet of the furnace

STEPS

S100 Providing a glass pane on a mounting
S200 Introducing the mounted glass pane into the inlet of the furnace
S300 Discharging the bent, mounted glass pane out of the outlet of the furnace
S400 Withdrawing the bent, mounted glass pane from the mounting
S500 Installing thermal insulation on the mounting
S550 Checking whether the temperature has dropped to or below a specified value
S560 Switching the heating device on
S600 Returning the mounting and the thermal insulation S650 Checking whether the temperature has reached or exceeded a specified value
S660 Switching the heating device off
S700 Removing the thermal insulation

The invention claimed is:

1. A method for bending a glass pane in a furnace, wherein the furnace has an inlet and an outlet, comprising the steps:
providing a glass pane on a mounting, wherein the mounting is preheated,
introducing the mounted glass pane into the inlet of the furnace for bending,
discharging the bent, mounted glass pane out of the outlet of the furnace,
withdrawing the bent, mounted glass pane from the mounting,
installing thermal insulation on the mounting,
returning the mounting and the thermal insulation using a transport device so that the mounting and the thermal insulation are moved together by the transport device,
removing the thermal insulation from the mounting and removing the mounting from the transport device, prior to providing a following glass pane on said mounting,
wherein the aforementioned steps are carried out again in a cyclical manner, and wherein the mounting is heated, at least intermittently, between withdrawing the bent, mounted glass pane from the mounting and introducing the following glass pane provided on said mounting into the inlet of the furnace.

2. The method according to claim 1, wherein the thermal insulation is implemented like a hood and is put over the mounting during the installing of the thermal insulation.

3. The method according to claim 1, wherein the mounting is transported out of the outlet of the furnace into the inlet of the furnace in less than 60 seconds.

4. The method according to claim 1, wherein, at least intermittently, controlled/regulated or uncontrolled heating of the mounting is provided between withdrawing the bent, mounted glass pane from the mounting and introducing the following glass pane provided on said mounting into the inlet of the furnace.

5. The method according to claim 1, wherein a temperature of the mounting is 200° C. or more before entry into the furnace.

6. The method according to claim 1, wherein a heating device to heat the mounting is mounted on the transport device or the mounting.

7. The method according to claim 1, wherein the mounting includes a lower end and an upper end and wherein a heating device to heat the mounting is arranged on the lower end of the mounting during transport by means of the transport device.

8. The method according to claim 1, further comprising measuring a temperature of the mounting with a temperature sensor, determining whether the temperature has dropped to or below a specified value, and, if the temperature has dropped to or below the specified value, heating the mounting with a heating device.

9. The method according to claim 8, wherein the specified value is 200° C.

10. The method according to claim 1, wherein the following glass pane is different from said glass pane.

11. The method according to claim 1, wherein the mounting is preheated to a temperature of more than 180° C.

12. The method according to claim 11, wherein the mounting is preheated to a temperature of more than 200° C.

13. The method according to claim 1, wherein the thermal insulation is a hood that includes rock wool, glass wool, an ethylene-propylene copolymer, a polyimide, or a silicone-coated glass fiber fabric.

14. The method according to claim 1, wherein the mounting is heated using an electrical resistance heater, or a burning gas or by induction.

15. A method for bending a glass pane in a furnace, wherein the furnace has an inlet and an outlet, comprising the steps:
providing a glass pane on a mounting, wherein the mounting is preheated,
introducing the mounted glass pane into the inlet of the furnace for bending,
discharging the bent, mounted glass pane out of the outlet of the furnace,
withdrawing the bent, mounted glass pane from the mounting,
installing thermal insulation on the mounting,
returning the mounting and the thermal insulation using a transport device so that the mounting and the thermal insulation are moved together by the transport device,
removing the thermal insulation from the mounting and removing the mounting from the transport device, prior to providing a following glass pane on said mounting,
wherein the aforementioned steps are carried out again in a cyclical manner, and wherein a heating device is mounted on the transport device or the mounting, said heating device heating at least part of the mounting when the thermal insulation is installed on the mounting and the mounting and the thermal insulation are moved by the transport device.

16. The method according to claim 15, wherein the thermal insulation is a hood that includes rock wool, glass wool, an ethylene-propylene copolymer, a polyimide, or a silicone-coated glass fiber fabric.

17. The method according to claim 15, wherein the heating device is an electrical resistance heater.

18. The method according to claim 15, wherein the following glass pane is different from said glass pane.

* * * * *